United States Patent [19]

Shatters

[11] 4,339,844
[45] Jul. 20, 1982

[54] ASSEMBLY FOR HOLDING OPEN A DOOR OR THE LIKE

[75] Inventor: Dale R. Shatters, Aurora, Ill.

[73] Assignee: Caterpillar Tractor Co., Peoria, Ill.

[21] Appl. No.: 921,017

[22] Filed: Jun. 30, 1978

[51] Int. Cl.³ .................... E05F 5/02; E05F 7/06; F16C 11/06
[52] U.S. Cl. ........................ 16/82; 403/96; 49/394
[58] Field of Search ............ 16/82; 49/394; 403/93, 403/92, 94, 96

[56] References Cited

U.S. PATENT DOCUMENTS

| | | | |
|---|---|---|---|
| 579,277 | 3/1897 | Lord et al. | 403/96 |
| 610,352 | 9/1898 | Grady | 403/96 |
| 731,679 | 6/1903 | Harrison et al. | 403/92 |
| 2,781,560 | 2/1957 | Ziesmer | 49/394 |
| 2,889,160 | 6/1959 | Nelson | 403/93 |
| 3,045,271 | 7/1962 | Cinotti | 403/96 |

FOREIGN PATENT DOCUMENTS 650630 9/1937 Fed. Rep. of Germany ........ 403/96

*Primary Examiner*—Doris L. Troutman
*Attorney, Agent, or Firm*—William B. Heming

[57] ABSTRACT

An arm assembly (10) having first and second arms (20,22), a first apparatus (26) and an adjusting element (24) is used to adjustably hold open a door (18), window, or the like on a work vehicle (12), for example. In the harsh environment of the work vehicle (12), the door (18) must be securely held open. The first apparatus (26) pivotally connects the first and second arms (20,22). The second arm (22) has an opening (46) alignable with an opening (44) of the first arm (20) in response to moving one of the arms (20,22). A member (48) has a first end portion (50) and is connected to the first apparatus (26). The member (48) is movable between a first position (54) at which the first end portion (50) is positioned in the openings (44,46) of the first and second arms (20,22) for maintaining the door (18) in an open position and a second position (56) at which said first end portion (50) is spaced from the second arm opening (46) for changing the door position.

9 Claims, 6 Drawing Figures

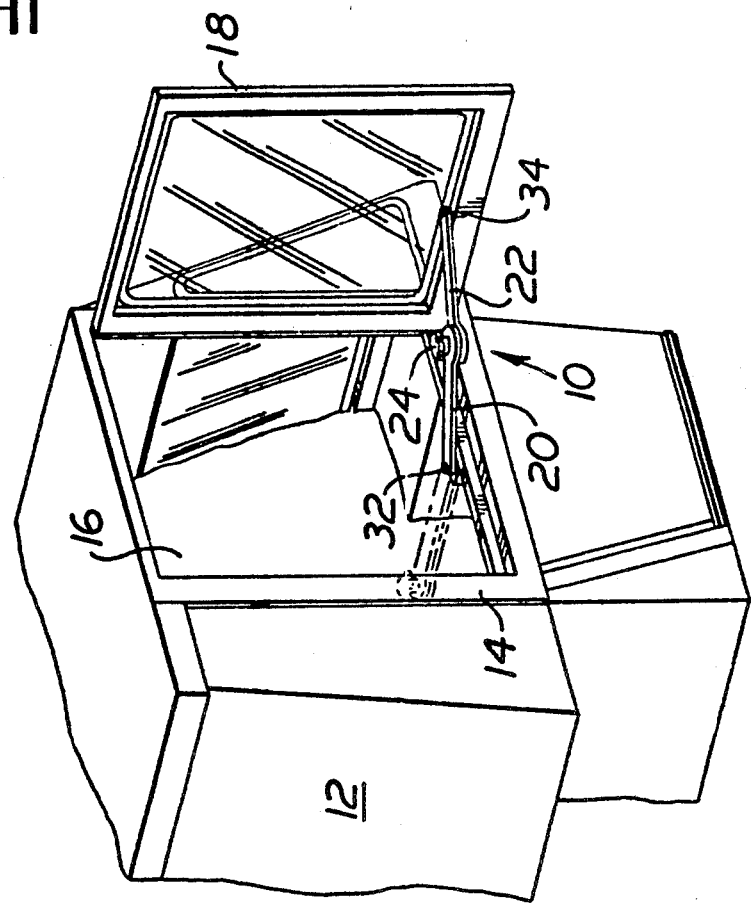

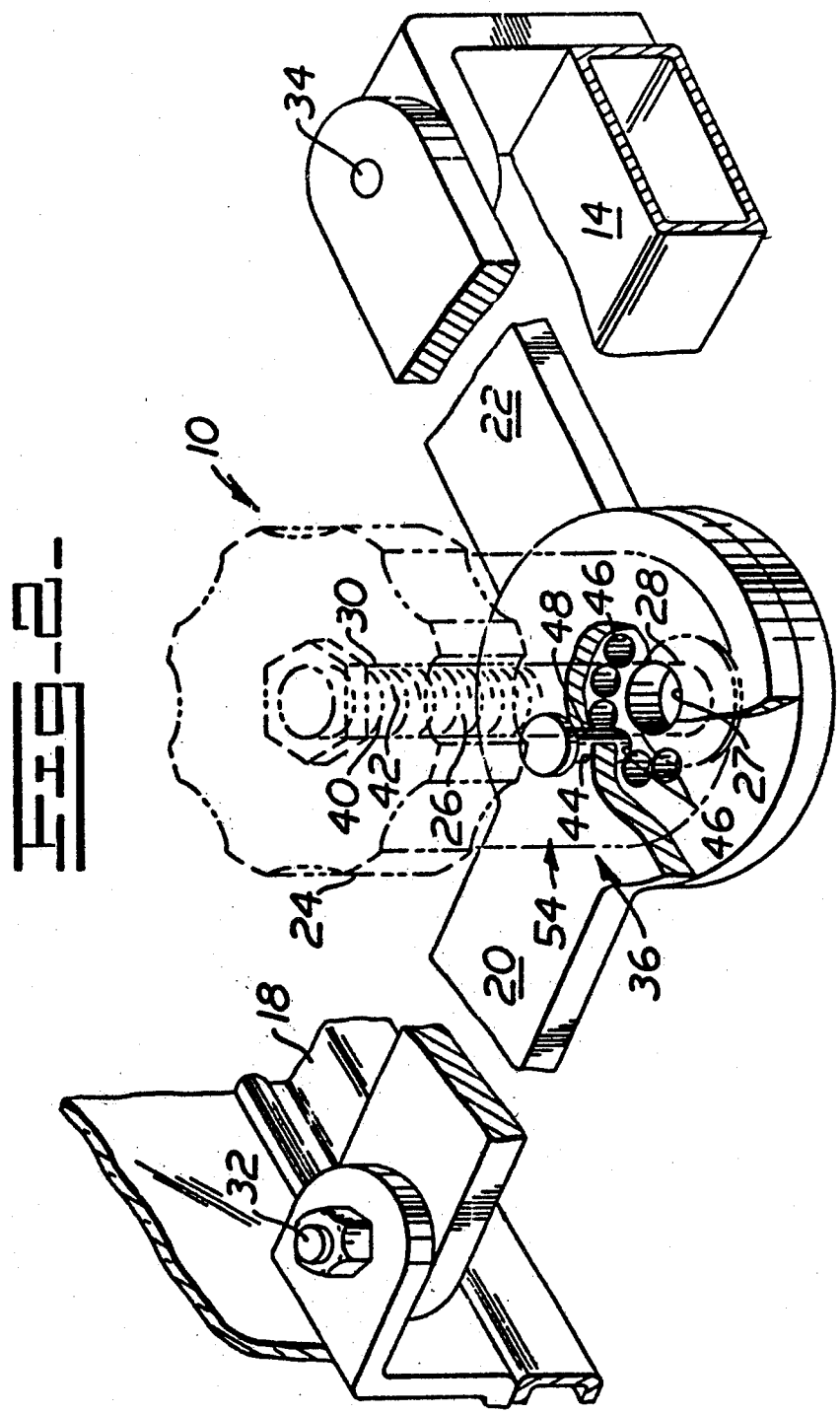

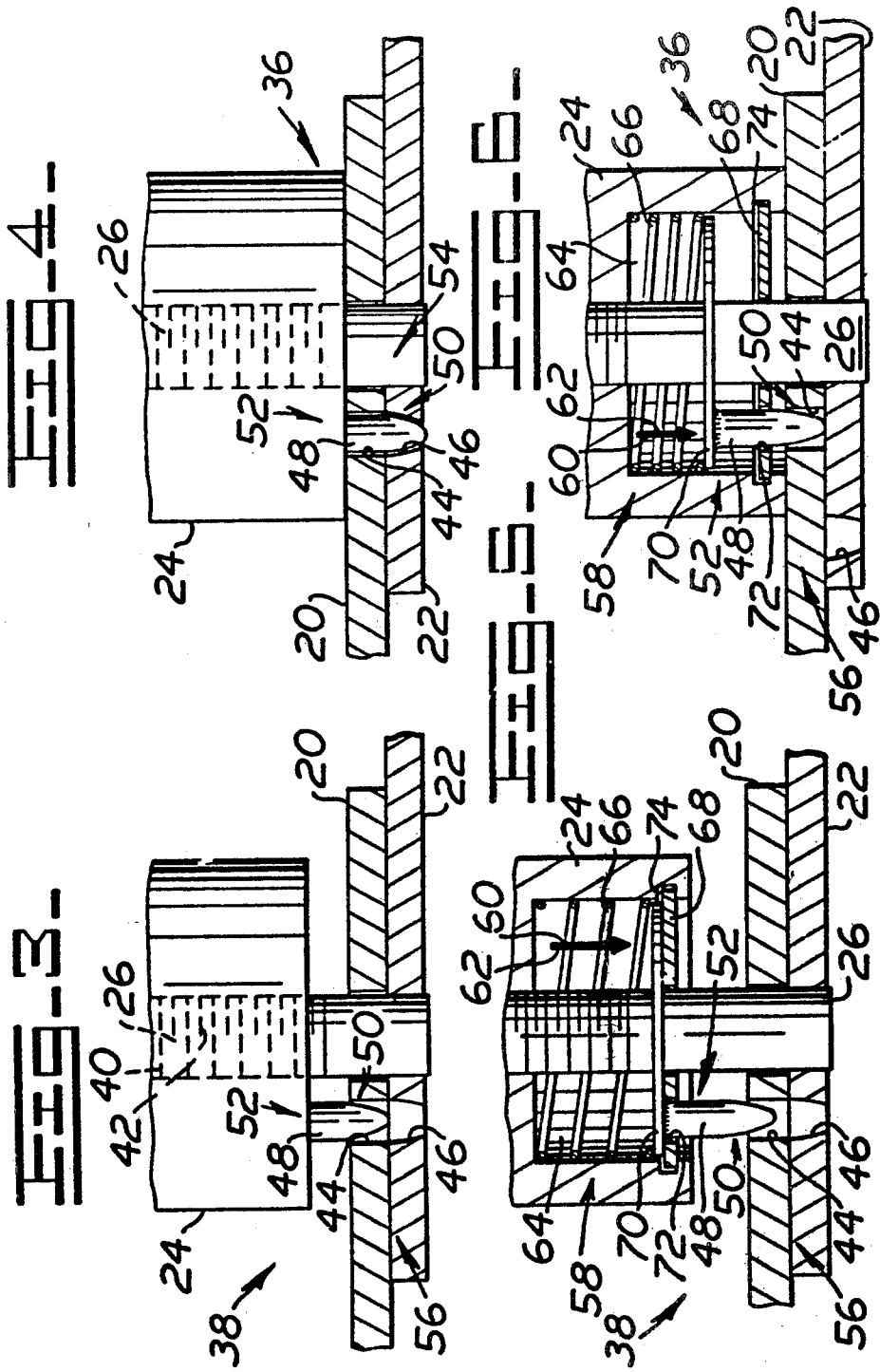

ASSEMBLY FOR HOLDING OPEN A DOOR OR THE LIKE

TECHNICAL FIELD

The invention relates to an arm assembly used to maintain a door, window or the like in a preselected open position. More particularly, the invention relates to first and second arms having alignable openings and a member movable between a first position at which a first end portion of the member is positioned in the first and second arm openings and a second position at which said first end is spaced from the second arm opening.

BACKGROUND ART

In the use of such an arm assembly, it is desirable to securely maintain the arms in position one relative to the other to substantially overcome the problems associated with the unforeseen closing of a door or the like being held open by said arm assembly.

The door of a work vehicle, for example, is generally opened for ventilation during operation of the vehicle. The harsh environment of the vehicle tends to shake and cause impacts on the vehicle. This can sometimes cause the door of the vehicle to unforeseeably close and damage the associated components. This represents a waste of time and labor to repair the components and also presents a nuisance to the operator in having to readjust the door during operation of the vehicle.

Therefore, it is desirable to provide a member controllably positioned in respective openings of first and second arms of the arm assembly for securely maintaining the relative positions of the arms and preventing undesirable movement of the door.

DISCLOSURE OF THE INVENTION

In one aspect of the invention, an arm assembly has first and second arms, an adjusting element, and a holding element connected at a first end portion to the second arm. The first arm is positioned between the second arm and adjusting element. The adjusting element is associated with the holding element in a manner sufficient for being controllably movable between first and second positions. The second arm has an opening alignable with an opening on the first arm in response to moving one of said arms. A member has a first end portion and is movable between first and second positions in response to moving the adjusting element. At the first position, said first end portion is positioned in the openings of the first and second arms. At the second position, the first end portion is spaced from the second arm opening.

A door of a work vehicle is generally opened for ventilation during operation of the vehicle. The door can sometimes undesirably close, causing damage to the vehicle and inconvenience to the operator. In the arm assembly, the member is positioned in the openings of the first and second arms for maintaining the relative positions of said arms to hold the door open. The member is movable from the opening in the second arm for moving the arms to close the door.

BRIEF DESCRIPTION OF THE DRAWINGS

FIG. 1 is an isometric view of an embodiment of the invention associated with a work vehicle;

FIG. 2 is a diagrammatic view showing an embodiment of the invention in greater detail;

FIG. 3 is a diagrammatic view showing an embodiment of the invention in still greater detail;

FIG. 4 is a diagrammatic view showing another embodiment of the invention; and

FIG. 5 is a diagrammatic view showing another embodiment of the invention in greater detail.

BEST MODE FOR CARRYING OUT THE INVENTION

Referring to the drawings, an arm assembly 10 is associated with a work vehicle 12. The work vehicle 12 has a frame 14, an opening 16, and a cover 18 of a construction sufficient for closing the opening 16. The cover 18 is shown as a door 18. Said door 18 is hingedly mounted to the frame 14 of the vehicle 12.

The arm assembly 10 has first and second arms 20,22, an adjusting element 24 and first means 26. The first means 26 is provided for pivotally connecting said first and second arms 20,22. Preferably, said first means 26 is a holding element 26. The first arm 20 is positioned between the second arm 22 and the adjusting element 24. As is shown, said first arm 20 has an opening 27 through which the holding element 26 passes. The holding element 26 has first and second end portions 28,30 and is connected at the first end portion 28 to the second arm 22. The first and second arms 20,22 are pivotally connected to the frame 14 and door 18, respectively, with respective pins 32,34, as is shown in FIG. 1. Connection of said arms 28,30 can also be reversed (FIG. 2).

The adjusting element 24 is controllably movable between first and second positions 36,38. At the first position 36 (FIGS. 4 and 6), the adjusting element 24 is immediately adjacent and contactable with the first arm 20. At the second position 38, the adjusting element 24 is spaced from the first arm 20 (FIGS. 3 and 5). The adjusting element 24 is shown as a knob 24. Preferably, the adjusting element 24 and second end portion 30 of the holding element 26 each have mating threads 40,42 and are threadably connected one to the other for moving the adjusting element 24 between the first and second positions 36,38.

The first arm 20 has an opening 44. The second arm 22 has an opening 46 alignable with the opening 44 of the first arm 20 in response to pivotally moving one of said arms 20,22. As is shown in FIG. 2, the second arm 22 preferably has a plurality of openings 46 each alignable with the opening 44 of the first arm 20 in response to moving one of said arms 20,22.

The arm assembly 10 also has a member 48 connected to the adjusting element 24. The member 48 has first and second end portions 50,52 and is movable between first and second positions 54,56. At the first position 54, said first end portion 50 is positioned in the openings 44,46 of the first and second arms 20,22, as is shown in FIGS. 2 and 4. At the second position 56 (FIGS. 3, 5 and 6), the first end portion 50 is spaced from the opening 46 of the second arm. It is desirable that at said second position 56, the member 48 remain positioned in the first arm opening 44. Said member 48 moves in response to moving the adjusting element 24. In the embodiment of FIGS. 3 and 4, the member 48 is connected at the second end portion 52 to the adjusting element 24.

It is desirable that the arm assembly 10 include second means 58 for biasing the member 48 in a direction 60 toward the second arm 22 (FIGS. 5 and 6). The second means 58 preferably urges the member 48 in the direction 60 toward the second arm 22 with increasingly greater force in response to moving the adjusting element 24 in a direction 62 toward the first position 36. Said directions 60,62 are substantially the same.

Referring to FIGS. 5 and 6, the adjusting element 24 has an opening 64. The second means 58 is a spring 66 positioned in said opening 64 of the adjusting element 24. The spring 66 has a preselected spring constant.

The second means 58 includes first and second retaining members 68,70. The first retaining member 68 has an opening 72 alignable with the opening 44 of the first arm 20. Said first member 68 is rotatably connected to the adjusting element 24 and positioned in the opening 64 of said adjusting element 24. The first member 68 is positioned and freely moves in an annular opening 74 of the adjusting element 24. The second retaining member 70 is positioned between the spring 66 and the first retaining member 68. Said second member 70 is connected to the second end portion 52 of the member 48.

Industrial Applicability

In the use of the arm assembly 10, the member 48 is positioned in the openings 44,46 to prevent movement of the first arm 20 relative to the second arm 22 for securely holding the door 18 in an open position.

For example, as is shown in outline in FIG. 1, the arms 20,22 are substantially parallel one to the other when the door 18 is closed. The knob or adjusting element 24 is also in the first position 36.

To open the door 18, the knob 24 is moved toward the second position 38. The door 18 is moved toward the desired open position. The first arm 20 pivots relative to the second arm 22 about the holding element 26. The openings 46 in the second arm 22 each progressively align with the opening 44 in the first arm 20 as the first arm 20 pivots. Alignment of one of said second arm openings 46 and the first arm opening 44 defines an open position of the door 18 relative to the frame 14 at which said door 18 can be maintained.

The knob 24 is moved to the first position 36 to maintain the door 18 in the desired open position. During movement of the member 48 toward the first position 54, said member 48 passes into the aligned openings 44,46 and there maintains the first and second arms 20,22 against subsequent relative movement. Said arms 20,22 are maintained against movement owing to the relationship of the second arm 22 and knob 24 to the holding element 26 and the first and second arms 20,22 and knob 24 to the member 48.

Where present, the spring 66 accommodates moving the knob 24 to the first position 36 if the opening 44 of the first arm 20 is not aligned with one of the openings 46 in the second arm (FIG. 6). In the above relationship of the openings 44,46, the first and second arms 20,22 remain movable relative one to the other. The door 28 is moved to align the openings 44,46 at a desired open position. The member 48 moves into the aligned one of the openings 46 of the second arm 22 owing to the biasing force of the spring 66 in the direction 60 toward said second arm 22. The preselected spring constant of said spring 66 is dependent upon accommodating moving of the knob 24 to the first position 36 if said openings 44,46 are not aligned and causing movement of the member 48 into the subsequently aligned one of the openings 46 in the second arm 22.

In the above-described manner, the door 18 is securely held in an open position and can be closed by moving the knob 24 toward the second position 38 to remove the member 48 from the aligned one of the openings 46 in the second arm 22.

Other aspects, objects, and advantages of this invention can be obtained from a study of the drawings, the disclosure, and the appended claims.

What is claimed is:

1. In an arm assembly (10) having first and second arms (20,22), first means (26) for pivotally connecting said first and second arms (20,22) and an adjusting element (24) connected to said first means (26), said first arm (20) being positioned between the second arm (22) and the adjusting element (24), said adjusting element (24) being controllably movable between a first position (36) at which said adjusting element (24) is immediately adjacent and contactable with the first arm (20) and a second position (38) at which said adjusting element (24) is spaced from the first arm (20), the improvment comprising:

said first arm (20) having an opening (44);
said second arm (22) having an opening (46) alignable with the opening (44) of the first arm (20) in response to pivotally moving one of said arms (20,22);
said adjusting element (24) and said holding element (26) each having mating threads and being threadably connected one to the other; and
a member (48) having first and second end portions (50,52) and being movable with the adjusting element (24) between a first position (54) at which said first end portion (50) is positioned in the aligned openings (44,46) of the first and second arms (20,22) and a second position (56) at which said first end portion (50) is removed from at least said second arm opening (46) in response to rotatably moving the adjusting element (24) along its mating threads.

2. The arm assembly (10), as set forth in claim 1, including second means (58) for biasing said member (48) in a direction (60) toward the second arm (22).

3. The arm assembly (10), as set forth in claim 2, wherein the second means (58) urges the member (48) in the direction (60) toward the second arm (22) with increasingly greater force in response to moving the adjusting element (24) in a direction (62) toward the first position (36).

4. The arm assembly (10), as set forth in claim 2, wherein the adjusting element (24) has an opening (64) and the second means (58) is a spring (66) having a preselected spring constant and being positioned in said opening (64) of the adjusting element (24).

5. The arm assembly (10), as set forth in claim 4, wherein the second means (58) includes first and second retaining members (68,70), said first retaining member (68) having an opening (72) alignable with the opening (44) of the first arm (20) and being rotatably connected to said adjusting element (24), said second retaining member (70) being positioned between the spring (66) and the first retaining member (68) and connected to the second end portion (52) of the member (48).

6. The arm assembly (10), as set forth in claim 1, wherein the second arm (22) has a plurality of openings (46) each alignable with the opening (44) of the first arm (20) in response to moving one of said arms (20,22).

7. The arm assembly (10), as set forth in claim 1, wherein the first means (26) is a holding element (26) having first and second end portions (28,30) and being connected at the first end portion (28) to the second arm (22).

8. A vehicle (12) having a frame (14), an opening (16), and a cover (18) of a construction sufficient for closing the opening (16), comprising:
a first arm (20) having an opening (44) and being connected to one of the frame (14) and cover (16);
a second arm (22) having an opening (46) and being connected to the other of the frame (14) and cover (16), said opening (46) being alignable with the opening (44) of the first arm (20) in response to pivotally moving one of said arms (20,22);
a holding element (26) pivotally connecting said first and second arms (20,22);
an adjusting element (24) threadably connected to said holding element (26) and being controllably movable between a first position (28) at which said adjusting element (24) is immediately adjacent and contactable with the first arm (20) and a second position (30) at which said adjusting element (24) is spaced from the first arm (20);
a member (48) having first and second end portions (50,52) and being connected to the adjusting element (24) and movable between a first position (54) at which said first end portion (50) is positioned in the openings (44,46) of the first and second arms (20,22) and a second position (56) at which said first end portion (50) is spaced from said second arm opening (46) in response to moving the adjusting element (24); and
biasing means (26) for automatically urging said member (48) from its second position (52) into its first position (50) in response to aligning the openings (44,46) of the first and second arms (21,22).

9. In an arm assembly (10) having first and second arms (20,22), first means (26) for pivotally connecting said first and second arms (20,22) and an adjusting element (24) connected to said first means (26), said first arm (20) being positioned between the second arm (22) and the adjusting element (24), said adjusting element (24) being controllably movable between a first position (36) at which said adjusting element (24) is immediately adjacent and contactable with the first arm (20) and a second position (38) at which said adjusting element (24) is spaced from the first arm (20), the improvement comprising:
said first arm (20) having an opening (44);
said second arm (22) having an opening (46) alignable with the opening (44) of the first arm (20) in response to pivotally moving one of said arms (20,22);
a member (48) having first and second end portions (50,52) and being connected to the adjusting element (24) and movable between a first position (54) at which said first end portion (50) is positioned in the openings (44,46) of the first and second arms (20,22) and a second position (56) at which said first end portion (50) is spaced from said second arm opening (46) in response to moving the adjusting element (24);
said adjusting element (24) having an opening (64); and
second means (58) for biasing said member (48) in a direction (60) toward the second arm (22), said second means (58) including a spring (66) and first and second retaining members (68,70), said spring (66) having a preselected spring constant and being positioned in said opening (64) of the adjusting element (24), said first retaining member (68) having an opening (72) alignable with the opening (44) of the first arm (20) and being rotatably connected to said adjusting element (24) and positioned in the opening (64) of said adjusting element (24), said second retaining member (70) being positioned between the spring (66) and the first retaining member (68) and connected to the second end portion (52) of the member (48).

* * * * *